United States Patent [19]

Jones

[11] Patent Number: 6,054,105

[45] Date of Patent: Apr. 25, 2000

[54] PROCESS FOR THE SOLVENT EXTRACTION OF NICKEL AND COBALT VALUES IN THE PRESENCE OF MAGNESIUM IONS FROM A SOLUTION

[75] Inventor: David L. Jones, Delta, Canada

[73] Assignee: Cominco Engineering Services Ltd., Vancouver, Canada

[21] Appl. No.: 09/200,712

[22] Filed: Nov. 27, 1998

Related U.S. Application Data

[60] Division of application No. 08/660,290, Jun. 7, 1996, Pat. No. 5,855,858, which is a continuation-in-part of application No. 08/488,128, Jun. 7, 1995, Pat. No. 5,650,057, which is a continuation-in-part of application No. 08/425,117, Apr. 21, 1995, Pat. No. 5,645,708, which is a continuation-in-part of application No. 08/098,874, Jul. 29, 1993, Pat. No. 5,431,788.

[51] Int. Cl.$^7$ ........................... B01D 11/00; C22B 23/00; C22B 26/20

[52] U.S. Cl. ........................... 423/139; 423/157

[58] Field of Search .................. 423/139, 157; 205/589

[56] References Cited

U.S. PATENT DOCUMENTS 2,377,832  6/1945  Wallis et al. .
2,488,561  11/1949  Schaal .
2,793,936  5/1957  Voos .
3,642,440  2/1972  Holmes et al. .
3,728,105  4/1973  Skarbo .
3,798,304  3/1974  Weston .
3,932,581  1/1976  Leimala ................................ 423/139
3,933,975  1/1976  Nicklic et al. .
4,541,868  9/1985  Lowenhaupt et al. .
4,900,522  2/1990  Chou et al. .
5,470,552  11/1995  Kordosky et al. .................. 423/139
5,779,997  7/1998  Nyman et al. ...................... 423/139

FOREIGN PATENT DOCUMENTS

19035  1/1902  United Kingdom .

*Primary Examiner*—Steven Bos
*Attorney, Agent, or Firm*—Elbie R. de Kock

[57] ABSTRACT

A process for the extraction of nickel and/or cobalt values from a solution comprises the steps of effecting a cobalt solvent extraction in the presence of magnesium ions with a cobalt extractant to produce a cobalt extractant loaded with cobalt ions and a first raffinate containing nickel and magnesium ions in solution. The first raffinate is subjected to magnesium solvent extraction with a magnesium extractant to produce a magnesium extractant loaded with magnesium and cobalt ions and a second raffinate. The second raffinate is subjected to nickel solvent extraction with a nickel extractant to produce a nickel loaded extractant and a third raffinate.

11 Claims, 5 Drawing Sheets

PROCESS FOR THE SOLVENT EXTRACTION OF NICKEL AND COBALT VALUES IN THE PRESENCE OF MAGNESIUM IONS FROM A SOLUTION

CROSS REFERENCE TO RELATED APPLICATION

This application is a division of U.S. patent application Ser. No. 08/660,290 filed Jun. 7, 1996, now U.S. Pat. No. 5,855,858, which is a continuation-in-part of U.S. patent application Ser. No. 08/488,128 filed Jun. 7, 1995, now U.S. Pat. No. 5,650,057, which, in turn, is a continuation-in-part of U.S. patent application Ser. No. 08/425,117 filed Apr. 21, 1995, now U.S. Pat. No. 5,645,708, which, in turn, is a continuation-in-part of U.S. patent application Ser. No. 08/098,874 filed Jul. 29, 1993 which issued as U.S. Pat. No. 5,431,788 on Jul. 11, 1995. The contents of the foregoing applications are incorporated herein by reference.

FIELD OF THE INVENTION

This invention relates to a process for the extraction of nickel and/or cobalt values from a solution.

BACKGROUND OF THE INVENTION

Nickel sulphide ores are presently treated in commercial practise by a variety of processes in which the first step is almost always a physical concentration by flotation to upgrade the Ni content, typically, from a range of 0.5% to 2.0% up to 7 to 25% Ni, as a concentrate. The subsequent treatment of this concentrate is usually pyrometallurgical (smelting) to produce a Ni matte or an artificial high grade sulphide with about 20% to 75% Ni.

The matte is then generally refined to nickel products by hydrometallurgical techniques.

This combination of pyrometallurgical/hydrometallurgical processing of Ni concentrates is now well established commercially with a number of variations, particularly in the hydrometallurgical portion. Most processes recover some portion of the associated metal values where present, such as copper and cobalt. In addition, a leach residue containing precious metals, such as gold and silver, as well as platinum group elements, e.g. platinum and palladium, is often produced for subsequent recovery of contained values.

This treatment scheme has some inherent drawbacks. Those associated with the pyrometallurgical step, include:
(i) Production of smelter gases including $SO_2$, which must now be treated in an acid plant to produce sulphuric acid byproduct, which frequently is difficult to market from a remote location. (The capital and operating costs of such acid plants impact on the overall economies of the process.)
(ii) Losses of nickel and particularly cobalt into the slag produced during smelting, often more than 50% of cobalt input.
(iii) High costs of smelting in general, particularly for low grade concentrates (<10% Ni).
(iv) Difficulty in treating certain concentrates with deleterious elements, such as magnesium (Mg) and arsenic (As).

The hydrometallurgical steps for treating Ni matte vary considerably but all known commercial processes have one or more of the following disadvantages:
(i) High costs for reagents such as caustic soda or ammonia, required for neutralization.
(ii) Large byproduct production, such as ammonium sulphate or sodium sulphate, which are difficult to market.
(iii) High energy costs, due to large temperature changes during the process.
(iv) Complex and costly process flowsheet, leading to high capital and operating costs.

As an alternative to the established pyrometallurgical/hydrometallurgical route outlined above, there is one known process using wholly hydrometallurgical steps, that treats concentrates without smelting. It uses a pressure leaching technique with ammoniacal solution. This avoids most of the disadvantages associated with the smelting processes, but unfortunately still suffers from all of the listed disadvantages of the known hydrometallurgical routes, and in fact is not even as efficient overall as the best of the pyrometallurgical/hydrometallurgical routes.

Copper or nickel sulphide ores often also contain other metal values, such as cobalt, as well as precious metals, such as gold and silver and the platinum group metals. Since these ores are typically low grade ores, in so far as copper/nickel is concerned, and also have a high sulphur to copper/nickel ratio, the economical extraction of copper, nickel and cobalt values have been problematical. Some sulphide ores contain such low copper/nickel values that the recovery of precious metals must be high in order to render the process economical. Due to the pyrite content of some ores, the recovery of gold by conventional cyanidation is often difficult, which also renders the treatment of the ore uneconomical.

The present invention provides a process for the extraction of nickel and cobalt values from a solution such as a solution obtained from the hydrometallurgical treatment of an ore or concentrate.

SUMMARY OF THE INVENTION

According to the invention there is provided a process for the extraction of nickel or cobalt values from a solution, comprising the steps of effecting a cobalt solvent extraction in the presence of magnesium ions with a cobalt extractant to produce a cobalt extractant loaded with cobalt ions and a first raffinate containing nickel and magnesium ions in solution effecting a magnesium solvent extraction on the first raffinate with a magnesium extractant to produce a magnesium extractant loaded with magnesium and cobalt ions and a second raffinate and effecting a nickel solvent extraction on the second raffinate using a nickel extractant to produce a nickel loaded extractant and a third raffinate.

The term "concentrate" in this specification refers to any material in which the metal value content has been increased to a higher percentage by weight as compared with the naturally occurring ore and includes man made artificial sulphide ore, such as matte, and metal values precipitated as solids such as hydroxides and sulphides.

Further objects and advantages of the invention will become apparent from the description of preferred embodiments of the invention below.

DETAILED DESCRIPTION OF PREFERRED EMBODIMENTS

The process is suitable for the treatment of copper ores, particularly copper sulphide ores, which also contain nickel and/or cobalt values, or nickel/cobalt sulphide ores without significant copper values, as well as nickel/cobalt oxide (laterite) ores. In addition, the process can treat nickel/cobalt ores with other elements often considered to be deleterious, such as magnesium, arsenic and zinc, or elements which are valuable and worth recovery, such as the precious metals, gold and silver, and the platinum group metals.

The feed ore or concentrate to the process may contain one or more sulphide minerals of the base metals Cu, Ni, Co and Zn, frequently combined with Fe and sometimes with other elements such as As, Sb, Ag, etc.

Typical sulphide minerals of the base metals listed above are:
Copper: $Cu_2S$—Chalcocite, $CuFeS_2$—Chalcopyrite
Nickel: NiS—Millerite, $(Ni,Fe)_9S_8$—Pentlandite
Cobalt: $Co_3S_4$—Linnaeite, (Co,Fe)AsS—Cobaltite
Zinc: ZnS—Sphalerite, (Zn,Fe)S—Marmatite The metal:sulphur ratio in this context is the ratio of the total base metals (Cu, Ni, Co, Zn) to sulphur in the concentrate, and this is a measure of the grade of the concentrate.

Typically the metal:sulphur ratio varies from 1.5 for high grade concentrates down to 0.2 for low grade concentrates. For concentrates that are predominantly Ni/Co, the metal:sulphur ratio is more often in the lower part of the range, from 0.2 to 0.8 (Fe is specifically excluded from this calculation, even though it is present in practically all sulphide concentrates).

The significance of the metal:sulphur ratio to the process, is that if affects the metallurgy occurring during the initial operation of pressure oxidation.

The different embodiments of the process may be used to treat a range of Ni/Co concentrates in which the metal:sulphur ratio varies from low to high as outlined above. However, in addition to this ratio, there is another important characteristic which must be taken into account. The degree of sulphur oxidation (to sulphate) during pressure oxidation. Sulphur contained in concentrate is converted during pressure oxidation either to elemental sulphur (S°) (no sulphur oxidation), or oxidized to sulphate ($SO_4^=$). Typically about 70–95% of the sulphur is not oxidized, and is produced as elemental sulphur. Expressed another way, sulphur oxidation (to sulphate) varies usually from 5 to 30%. It is considered beneficial to minimize sulphur oxidation, and it is an important objective of this process to do so. This is facilitated by the introduction of a source of sulphate or bisulphate, such as $H_2SO_4$, into the pressure oxidation stage.

The significance of sulphur oxidation is that it produces acid, which must eventually be neutralized, and it affects the distribution of Cu, Fe and other elements in the product slurry from pressure oxidation. Higher acid slurries (low pH) contain Cu in solution, whereas lower acid slurries (high pH) have Cu in solid form, as basic copper sulphate.

Figure 1:
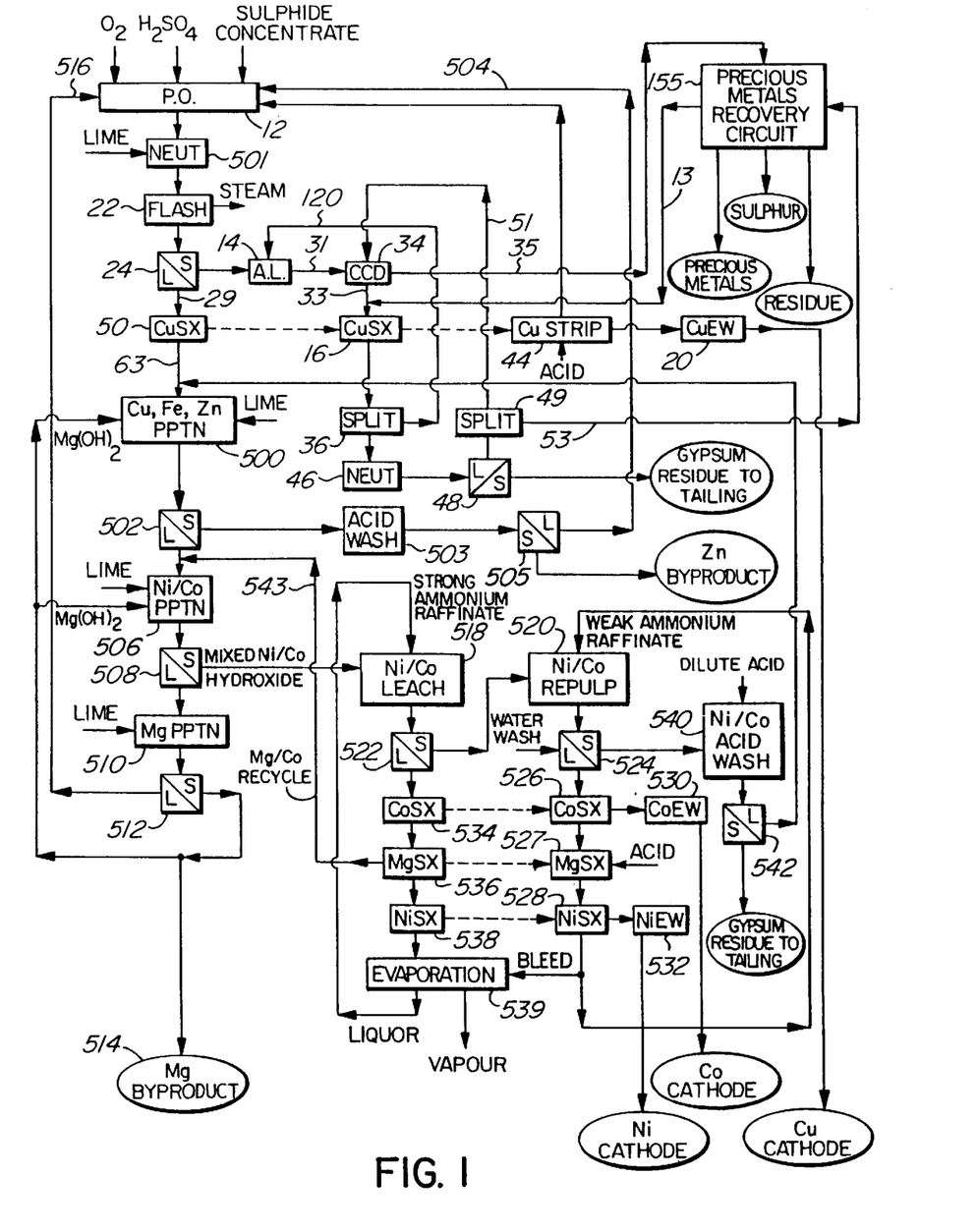
FIG. 1 is a flow diagram of a hydrometallurgical metal extraction process.

For concentrates with low metal:sulphur ratio and/or high sulphur oxidation, the process flowsheet shown in FIG. 1 is the general case. This is referred to as Mode C. Enough acid is produced during pressure oxidation 12, that it is necessary to neutralize this acid by slaked lime in the latter stages of the autoclave. This is indicated as the neutralization 501 in FIG. 1. Without this neutralization, the product slurry would have low pH, resulting in significant Fe in solution, and almost all of the Cu as well.

It is an important feature of the process that this product slurry contain minimal Fe in solution (less than 100 ppm) and about 1–5 g/l Cu in solution. By adjusting the amount of slaked lime added in the neutralization 501, these objectives can be achieved even with concentrates that have low metal:sulphur ratio and exhibit relatively high sulphur oxidation, e.g. 15–30%. A typical example of this type of concentrate is a pentlandite/pyrite type of mineral assemblage.

However, for concentrates that have high metal:sulphur ratio and/or low sulphur oxidation, the total amount of acid produced during pressure oxidation 12 is less, and no neutralization 501 may be required to achieve a product slurry with low Fe and Cu in the desired range. This embodiment of the process is termed Mode A and is described below with reference to FIG. 4. A typical example of this type of concentrate, is a pentlandite/chalcopyrite/pyrrhotite type of mineral assemblage.

In Mode A, the amount of acid consumed during pressure oxidation by other chemical reactions is more than sufficient to use up all the acid produced by sulphur oxidation.

Examples of both Mode A and Mode C required for two different concentrates are shown in the table below:

| PROCESS TYPE | CONCENTRATE ASSAY % | | | | METAL:SULPHUR RATIO | % SULPHUR OXIDATION |
|---|---|---|---|---|---|---|
| | Cu | Ni | Co | S | | |
| MODE A | 6.3 | 14 | 0.6 | 34 | 0.61 | 6 |
| MODE C | 0.1 | 22 | 0.6 | 29 | 0.78 | 15 |

Thus, the first concentrate with 14% Ni exhibited only 6% S oxidation in pressure oxidation, and thus was treated by Mode A, whereas the second concentrate required Mode C, due to the higher S oxidation (15%).

Process Mode C will now be described with reference to FIG. 1.

First the ore or concentrate is subjected to pressure oxidation 12 in an autoclave in the presence of an acidic solution containing sulphate, chloride and copper ions. In the present example the amount of $H_2SO_4$ introduced into the autoclave is about 40 g/l and the concentration of chloride in solution is about 10–12 g/l. Typically the temperature is about 90° C. to about 160° C. under an oxygen partial pressure of about 200–2000 kPa. The retention time is about 0.5–5.0 hours, depending inversely on temperature, and the process is normally carried out in a continuous fashion in the autoclave. However, the process can also be carried out in a batch-wise fashion, if desired.

The neutralization 501 is effected by pumping slaked lime into the last one or two compartments at the exit side of the autoclave, at about 10–20% solids in water.

After pressure oxidation 12, the slurry produced in the autoclave is discharged through one or more flash tanks 22 to reduce the pressure to atmospheric pressure and the temperature to 90–100° C.

The slurry is then further cooled and subjected to filtration 24 to produce a pressure oxidation filtrate 29 and a solid residue (pressure oxidation filter cake).

The neutralization step 501 is used to precipitate soluble copper into the pressure oxidation filter cake, that would otherwise report to the pressure oxidation filtrate 29. Thus, the neutralization 501 can be used to minimize copper in the filtrate 29, typically down to 1 to 5 g/l copper, which makes the subsequent removal of copper from solution easier. In addition, the neutralization 501 helps to minimize Fe in the pressure oxidation filtrate 29. However, when adding slaked lime it is preferable not to add too much so as to precipitate Ni/Co. Typically, adding slaked lime so that the pressure oxidation filtrate 29 has a pH of between about 3 and 4 has been found suitable for removing most of the copper and yet minimizing Ni/Co precipitation.

The pressure oxidation filtrate 29 is generally subjected to copper solvent extraction 50, particularly if significant copper values are present in the original concentrate, to recover the copper values and to reduce [Cu$^{2+}$] in the raffinate 63 as low as possible, typically less than 100 ppm. In addition, the pressure oxidation filter cake is subjected to an atmospheric leach 14 to recover copper in solution, which solution is subjected to Cu solvent extraction 16. The leach 14 is carried out with raffinate 120 from the Cu solvent extraction 16 which is dilute acid at about 3–20 g/l H$_2$SO$_4$. In addition the leach 14 helps wash the entrained solution containing any Ni/Co values out of the pressure oxidation filter cake. These values which will accumulate in stream 51 can be recovered on a bleed basis (say 1 to 10% of flow, depending on concentration) by precipitating at pH 7 to 8 with slaked lime as Ni/Co hydroxides, similar to the conditions in the precipitation 506, described below. The mixed Ni/Co hydroxide can then be filtered off and recycled to a purification stage 500, described below.

The slurry 31 resulting from the leach 14 is difficult to filter and liquid/solid separation is effected by means of a series of thickeners in a counter current decantation (CCD) arrangement 34. Wash water is provided by a portion of the raffinate from the solvent extraction 16, which is split at 36 and neutralized at 46 using limestone to remove acid. The slurry from the neutralization 46 is filtered at 48, to produce a gypsum residue and the liquid 51 is recycled as wash water.

The loaded extractant from the solvent extractions 50 and 16 is subjected to stripping 44 and is then sent to copper electrowinning 20.

Figure 2:
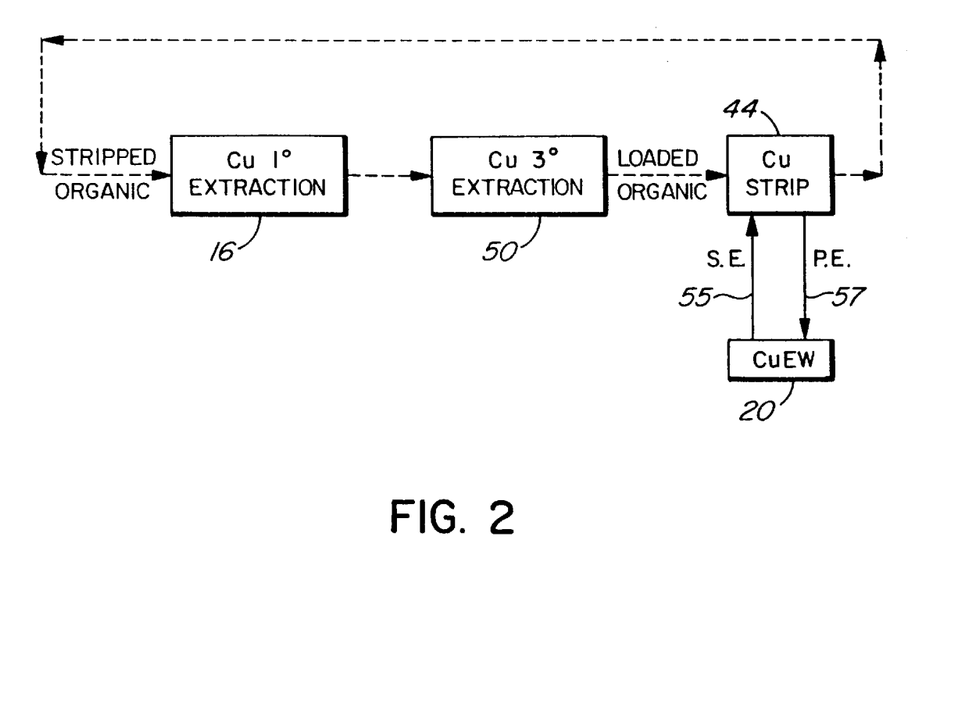
FIG. 2 is a flow diagram giving more details about the solvent extraction steps of the process of FIG. 1.

The Cu solvent extractions 50 and 16 are operated with a common extractant. This is shown in FIG. 2 where the broken line indicates the organic extractant being circulated after stripping 44. The stripping 44 is effected with spent acid or electrolyte 55 from the electrowinning 20 to obtain a pure copper sulphate solution or pregnant electrolyte 57 which is then passed to the electrowinning stage 20. Any suitable copper extractant capable of selectively removing Cu from an acid solution also containing Ni/Co/Zn/Fe, may be used. An extractant that is found to be suitable is a hydroxyoxime, such as LIX 84™ or LIX 864™ reagents from Henkel Corporation.

If no significant copper values are present in the ore or concentrate, it is nevertheless beneficial to carry out the pressure oxidation 12 in the presence of copper ions (e.g. 5 to 10 g/l Cu). Copper ions can be added in the form of a copper salt, such as CuSO$_4$ or CuCl$_2$. Thereafter, Cu solvent extraction and stripping are still carried out but the electrowinning 20 will be omitted and the pregnant copper liquor resulting from stripping 44 of the organic extractant will be recycled to the pressure oxidation 12. Alternatively, a copper concentrate can be added in which case the copper can be recycled after Cu solvent extraction and stripping or sent to electrowinning for recovery of the copper. This will also be the case if a laterite ore is being processed.

The raffinate 63 is subjected to a purification stage 500, to prepare a solution of Ni/Co free from elements such as Fe, Zn and Cu that cause difficulty in the subsequent process steps of solvent extraction and electrowinning of Ni and Co. The purification stage 500 is a precipitation step in which residual Cu, Fe and Zn are precipitated by the addition of slaked lime and recycled Mg(OH)$_2$. Typically, the feed solution to the purification stage 500 will contain copper and iron, as well as any zinc and magnesium present in the concentrate. The precipitation 500 is effected at a pH of about 5 to 6 so that, ideally, no more than about 1 ppm Zn, 1 ppm Cu and 1 ppm Fe remain in the solution. It is also important not to precipitate too much Ni/Co. This is achieved by careful control of pH, i.e. not allowing the pH to rise too high. The recycled Mg(OH)$_2$ has been found to be beneficial in this regard.

The product from the precipitation 500 is subjected to a liquid/solid separation 502. The Cu, Fe and Zn, which precipitate as hydroxides, can be reprocessed by a dilute acid wash or leach 503, particularly for Ni/Co recovery. The product from the acid wash 503 is subjected to a liquid/solid separation 505 leaving principally Cu, Fe and Zn hydroxides, which provides an outlet for zinc from the system. The liquid 504 from the liquid/solid separation 505, is recycled to the pressure oxidation 12.

If the Zn content is sufficiently high, the Cu/Fe/Zn hydroxide can be further leached with dilute acid to selectively recover zinc. In an extreme case, a zinc solvent extraction step can be included, if desired.

The concentrations of Ni, Co and Mg in solution after the precipitation 500 will depend on the composition of the concentrate. Depending on the mineralogy, it is possible that most of the magnesium in the concentrate leaches during the pressure oxidation 12. Thus, for Ni/Co concentrate containing say 20% nickel and 5% magnesium, the typical solution after the precipitation 500 will be about 30 g/l nickel and about 6 g/l magnesium. The magnesium content will be greater in the case of a laterite ore.

The solution resulting from the liquid/solid separation 502, is subjected to a selective precipitation step 506 in which Ni and Co are precipitated as hydroxides or carbonates with a suitable neutralization agent, such as slaked lime (Ca(OH)$_2$), soda ash (Na$_2$CO$_3$), ammonia or caustic soda (NaOH). This is effected at a pH of about 7 to 8, whilst minimizing the precipitation of Mg(OH)$_2$. A preferred neutralization agent is slaked lime due to its relatively low cost, and because the reaction does not introduce any new cations, such as Na$^+$ and NH$_4^+$, into the liquor.

Neutralization with Slaked Lime $$NiSO_4(aq) + Ca(OH)_2 \longrightarrow Ni(OH)_2(s) + CaSO_4 \cdot 2H_2O(s) \text{ (gypsum)} \tag{1}$$

A similar reaction occurs with CoSO$_4$ and MgSO$_4$, producing Co(OH)$_2$ and Mg(OH)$_2$ respectively.

Neutralization with Caustic Soda (NaOH)

$$NiSO_4(aq) + NaOH \rightarrow Ni(OH)_2(s) + NaSO_4(aq) \tag{2}$$

However, it is important to have some Mg present in the precipitated solid, which facilitates the separation of Ni and Co, as will be described below. A two-stage counter current precipitation sequence has been found beneficial.

In some circumstances, a precipitation with caustic soda or ammonia for instance that does not produce a solid byproduct (gypsum) is advantageous, so that the Ni precipitate is of a higher grade, and free from calcium.

The product from the precipitation step 506 is subjected to a liquid/solid separation 508.

The liquid from the liquid/solid separation 508 is subjected to a precipitation step 510, preferably again with slaked lime, for the same reasons as above, to precipitate additional Mg, if needed, thereby to prevent accumulation of Mg in the system. The product from the precipitation step 510 is subjected to a liquid/solid separation 512. The solid from the separation 512 is a magnesium hydroxide byproduct 514. As indicated above, some of the magnesium hydroxide byproduct 514 is recycled for use in the precipitation 500. The liquid from the separation 512 is recycled to the pressure oxidation 12, as indicated by the recycle stream 516.

The solid hydroxide cake from the separation step 508, containing the Ni and Co values, is subjected to a leach 518 with an ammonium solution at a pH of about 6 to 8.

The ammonium solution may be ammonium sulphate or ammonium carbonate but the former has been found to be superior because it has a lower pH, thus allowing for a better Co to Ni separation in solution. In addition, ammonium sulphate has a lower ammonia (gas) vapour pressure, and as well, the Ni/Co extractions are superior with ammonium sulphate. In the present example a 200 g/l ammonium sulphate solution is used.

The reactions which take place during the leach 518, in which soluble nickel and cobalt diammine sulphates are formed, are as follows:

$$(NH_4)_2SO_4 + Ni(OH)_2 \rightarrow Ni(NH_3)_2SO_4 + 2H_2O \quad (3)$$

$$(NH_4)_2SO_4 + Co(OH)_2 \rightarrow Co(NH_3)_2SO_4 + 2H_2O \quad (4)$$

The Mg present in the solid also dissolves, as follows:

$$(NH_4)_2SO_4 + Mg(OH)_2 \rightarrow MgSO_4 + 2H_2O + 2NH_3 \quad (5)$$

In carrying out the leach 518, it is not attempted to leach out 100% of the Ni/Co values in the solid but only about 90–99%. This enables the leach 518 to be carried out at a low pH rather than a higher pH of about 9 which would otherwise be required. This higher pH requires the addition of ammonia to the leach as a second reagent with the ammonium sulphate.

A further problem which arises is that the known or commercially available Co extractant does not function effectively at this high pH value. The extractant degrades and it is not selective against Ni. As a result, it is necessary to effect Ni extraction first, rather than Co extraction, which would then require reducing the pH by the addition of a further reagent such as acid, which would in turn mean production of byproduct ammonium sulphate and consumption of the reagent ammonia. Another problem that arises is that, in order to effect Ni solvent extraction first, it is necessary first to oxidize all the Co to the +3 oxidation state to avoid extraction of Co with Ni. This oxidation is difficult to achieve quantitatively. This, therefore, results in further process complications. Also it is necessary to reduce the $Co^{3+}$ back to $Co^{2+}$ following Ni extraction and this is equally difficult to achieve.

To avoid the above difficulties, the process provides effecting the leach 518 at a pH of about 6 to about 8 and then subjecting the resultant solid to a subsequent washing stage 520 with dilute ammonium sulphate solution, as will be described below.

A further aspect of the process is that the concentration of nickel ions in solution during the leach 518 is controlled to remain at a relatively low value of about 10 g/l maximum. It has been found that this results in better Ni recovery during the leach 518. With the amount of Ni present in the solid known, the appropriate volume of liquid required to arrive at the desired Ni concentration can be calculated.

The product from the leach 518 is subjected to liquid/solid separation 522.

The liquid from the separation 522 is subjected to a Co solvent extraction 534 to provide a Co loaded extractant and a raffinate which is then subjected to a Mg solvent extraction 536 to provide a Mg loaded extractant and a raffinate which is subjected to a Ni solvent extraction 538 to provide a Ni loaded extractant and a raffinate.

The raffinate from the Ni solvent extraction 538 is recycled to the leach 518.

The solid product from the liquid/solid separation 522 is subjected to the repulp or washing step 520 as indicated above where the solid is washed with ammonium sulphate solution. This is a weak ammonium sulphate solution of about 10% the concentration of the solution of the leach 518. It results from the washing of entrained ammonium sulphate solution from the solid in the washing step 520.

The product from the repulp step 520 is subjected to a liquid/solid separation 524 and the solid is washed with water. The wash water and liquid from the liquid/solid separation 524 is subjected to a Co solvent extraction 526 to again provide a Co loaded extractant and a raffinate which is subjected to Mg solvent extraction 527 to provide a Mg loaded extractant and a raffinate which is subjected to a Ni solvent extraction 528 to provide a Ni loaded extractant and a final raffinate which is recycled to the repulp step 520.

To compensate for the water added during the water wash at the separation 524, there is a bleed of the final raffinate to the strong ammonium sulphate raffinate coming from the Ni solvent extraction 538. For this purpose, the strong ammonium sulphate circuit includes an evaporation step 539 to compensate for the raffinate bleed from the weak ammonium sulphate raffinate.

The Co solvent extractions 534, 526, the Mg solvent extractions 536, 527 and the Ni solvent extractions 538, 528, respectively, are all operated with a common extractant, as is the case with the Cu solvent extractions 50, 16.

An extractant which has been found to be suitable for both Co and Mg extraction is an organic phosphorous acid extractant, more specifically an organic phosphinic acid based extractant, such as Cyanex 272™, of Cyanamid Inc., which comprises bis 2,4,4-trimethylpentyl phosphinic acid. For the Ni extraction, a hydroxy-oxime based extractant, such as LIX 84™, of by Henkel Corp, has been found to be suitable.

The respective Co, Ni and Mg loaded extractants are scrubbed with suitable aqueous solutions to remove entrained ammonium sulphate solution and then stripped with dilute acid to produce pure pregnant solutions of Co and Ni and a Mg pregnant liquor containing small amounts of Co and Ni. The Co and Ni solutions are sent to the Co and Ni electrowinning stages 530 and 532, respectively.

Prior to stripping, the Co loaded extractant is scrubbed with a Co concentrate solution which is split off from the Co pregnant solution going to Co electrowinning and/or a Mg concentrate solution which is split from the Mg pregnant liquor. This is to facilitate the removal of Ni values which may be present in the Co loaded extractant. Likewise, the Mg loaded extractant can be scrubbed with a Mg concentrate solution which is split off from the Mg pregnant liquor.

For good separation of Co from Ni during Co solvent extraction and Ni solvent extraction, it has been found beneficial to have some Mg present in the solution feed to the Co solvent extraction. Typically, solution analysis has the same ratio of Co to Ni as found in the original feed concentrate (commonly 1:30). Thus for 10 g/l Ni, 0.33 g/l Co is typical.

The same extractant is used for both the Co and Mg solvent extractions 534 and 536. The extractant is more selective for Co than for Mg, and more selective for Mg than for Ni. During the Co solvent extraction 534, the amount of extractant used is limited to occupy all the available sites with Co ions, to a major extent, and with Mg ions, to a lesser extent, which counteracts the extraction of Ni. During the Mg solvent extraction 536, the available sites are filled with mainly Mg ions and, to a lesser extent, with some Co ions and possibly also a small amount of Ni ions. The Ni and Co ions are then recovered by the recycle of the Mg pregnant liquor to the Ni/Co precipitation 506, as indicated by the arrow 543.

It has further been found beneficial to maintain a Mg concentration about equal to the Co concentration, although this may vary quite widely from say 1:5 to 5:1.

The benefit of having Mg present is that:
(i) it minimizes the amount of Ni that is extracted during Co solvent extraction, whilst allowing
(ii) high Co percent extraction, i.e., greater than 90%, and
(iii) a high Co to Ni ratio in the Co product, i.e., Co:Ni>1000:1.

Without Mg present, some compromise must be reached in the Co solvent extraction, whereby
(i) some Ni is co-extracted with Co, or
(ii) the Co extraction is incomplete, or
(iii) the Co to Ni ratio in the Co product is too low.

With Mg present, some Co (i.e. 5–10%) can be left un-extracted during Co solvent extraction and instead will be extracted during Mg solvent extraction. The products of Mg solvent extraction are:
(a) Pregnant liquor from stripping containing some Mg, Ni and Co, which is recycled and not lost; and
(b) Mg raffinate with very low Co levels, i.e. about 1 ppm, which allows the subsequent Ni solvent extraction to produce a very good Ni to Co ratio in the Ni pregnant liquor going to Ni electrowinning. Thus, very pure Ni cathodes and Co cathodes result.

The solid from the liquid/solid separation 524 is washed (540) with dilute acid to recover entrained Ni/Co which is recycled to the precipitation 500. The solid residue after the liquid/solid separation 542 is discarded.

A suitable temperature range for the Ni/Co leach 518 and Ni/Co solvent extractions has been found to be about 30° C. to 60° C. preferably about 40° C. to about 50° C.

Figure 3A:
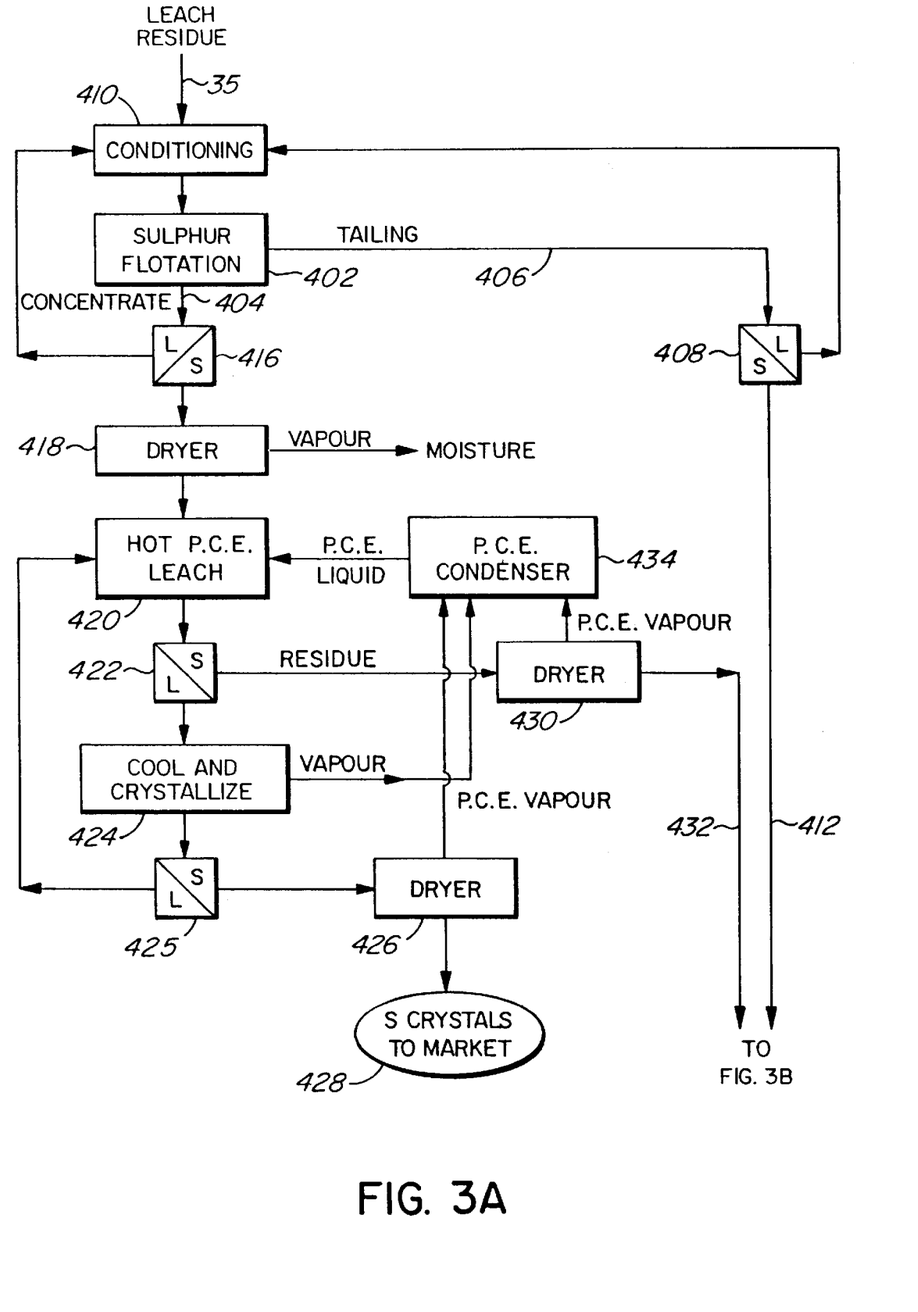
FIGS. 3A and B show a flow diagram of a further embodiment of the process for the recovery of precious metals.
Figure 3B:
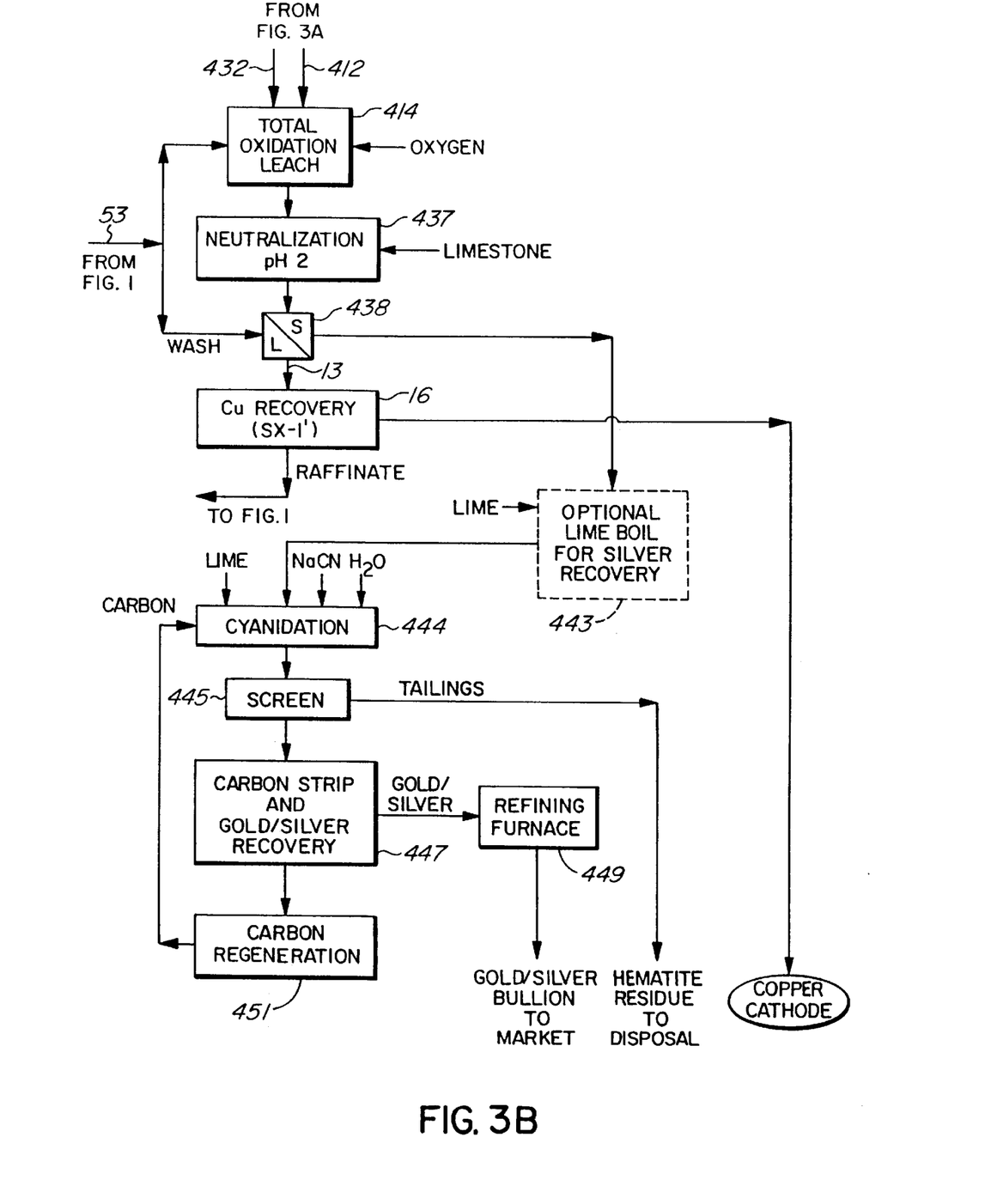

Turning now to FIGS. 3A and B, the recovery of precious metals, such as gold and silver, will be described. This process involves the treatment of the final residue stream 35 in FIG. 1.

The precious metals are not leached during the pressure oxidation stage 12 but remain in the solid residue 35 remaining after the atmospheric leaching stage 14.

In order to facilitate precious metal recovery, the flash down 22 from the pressure oxidation stage 12 is carried out in two stages. The first stage is at a temperature slightly above the freezing point of elemental sulphur, i.e. about 120° to 130° C. with a corresponding steam pressure of about 50–150 kPa. The process is preferably carried out in a continuous mode, the retention time at the first flash let-down stage being about 10 to 30 minutes.

The second flash let-down stage is at atmospheric pressure and about 90 to 100° C. with a retention time of again at least 10 minutes. This allows the elemental sulphur, which is still molten in the first flash-down stage, to convert to one of the solid phases, such as the stable orthorombic crystalline phase. This procedure facilitates the production of clean crystals of elemental sulphur, which is important to the recovery of the precious metals from the leach residue.

The leach residue 35 now produced by the atmospheric leaching stage 14 contains, in addition to the precious metals, hematite, crystalline elemental sulphur, unreacted sulphides (pyrite) and any additional products that may result from the particular concentrate being used, e.g. gypsum and iron hydroxides.

Gold in the residue 35 is believed to be largely untouched by the process so far and most likely is in the native state.

Silver, however, is oxidized in the pressure oxidation stage 12 and is probably present as a silver salt, such as silver chloride or silver sulphate.

It has been found that conventional cyanidation does not leach gold well from the residue 35. It is believed that this is due to the encapsulation of the gold in mineral particles, such as pyrite. The gold can however be liberated by the pressure oxidation of these minerals, referred to as "total oxidative leaching". In order to effect such leaching without oxidizing elemental sulphur also contained in the residue 35, the process comprises the step of removing as much of the elemental sulphur as possible.

Firstly, by virtue of the two stage flash-down, good quality sulphur crystals are produced. Secondly, the leach residue 35 is subjected to froth flotation 402 to produce a sulphur rich flotation concentrate 404 and a sulphur depleted flotation tail 406. The tail 406 is subjected to a solid/liquid separation 408 to produce a liquid which is recirculated to a conditioning tank 410 upstream of the flotation step 402 and a solid 412 which is sent to the total oxidative leaching stage 414.

The flotation concentrate 404 is filtered (416), and dried to a low moisture in a dryer 418. The product is then subjected to a sulphur leaching step 420 with a sulphur extractant. Any suitable sulphur extractant such as perchloroethylene (PCE) or kerosene may be used. In the present example hot PCE is used. The slurry from the leach 420 is filtered 422 and the resulting liquid is subjected to cooling 424 to produce crystalline S° and then filtered (425). The cooled sulphur can be subjected to an optional sulphur purification step (not shown) to remove impurities, such as selenium and tellurium, therefrom. The solid sulphur is dried in a dryer 426 to produce a sulphur product 428. The liquid from the filtration 425 is recycled to the hot PCE leach 420.

The solid residue from the filtration 422 is dried in a dryer 430. The resulting product, which is a low sulphur residue 432, is sent to the total oxidative leach 414.

The PCE vapours from the cooling 424 and the dryers 426 and 430 are recycled to the hot PCE leach 420 via a condenser 434.

A test was carried out in which 100 g of residue from the atmospheric leach 14 containing 25.1% elemental sulphur (S°) and 3% sulphide was processed through flotation 402 and leaching 420. This produced 73.8 g of desulphurized residue (feed material for the total oxidation leach 414) containing 1.9% S° and 4.1% sulphide, i.e. a total of 6% total sulphur.

The desulphurized residue contained 5.9% of the elemental sulphur (S°) in the original leach residue, i.e. 94.1% was recovered to a pure elemental sulphur product.

The total oxidative leach 414 is carried out at about 200° C.–220° C. and 200–2000 kPa oxygen partial pressure, sufficient to fully oxidize all sulphur and metal compounds to the highest valences, respectively. Thus all sulphur and pyrite are oxidized to sulphate. The oxidation is conducted in acidic conditions, such as with the acid being produced in situ. If sufficient pyrite is present, the reaction is highly exothermic and generally the desired operating temperature can be achieved. Typically about 10% of total oxidizable sulphur will be sufficient with normal percentage solids in the feed slurry.

After the total oxidative leaching 414, the slurry is subjected to neutralization 437 at pH 2–3 with limestone and then subjected to a liquid/solid separation 438 by means of a counter current decantation (CCD) circuit, to obtain a solid containing precious metals and a liquid 13 which may contain base metal values, such as copper. The liquid 13 can be combined with the liquid (stream 33) going to the solvent extraction 16 for the recovery of copper, as indicated in FIG. 1.

A portion of the neutralized stream 51 (FIG. 1) of the raffinate from the Cu solvent extraction 16 is split off at 49 and the resulting stream 53 is partly used (about 80%) as wash water in the liquid/solid separation 438 and partly recycled (about 20%) to the total oxidative leach 414, as indicated in FIG. 3B. The precious metals recovery circuit of FIGS. 3A and B is indicated by the block 155 in FIG. 1.

Prior to the cyanidation 444, the solids from the separation 438 can be subjected to an optional slaked lime boil step 443 to facilitate the recovery of silver during the cyanidation 444 by the decomposition of silver jarosite compounds formed during the total oxidative leach 414.

The precious metals are in the solids remaining after the separation 438. Now that pyrite and other encapsulating minerals in the original concentrate have been decomposed, the precious metals are amenable to cyanidation 444.

In the cyanidation step 444, the solids are leached with NaCN under alkaline conditions. In order to effect this, the solids are slurried up with cyanide solution to form a 30–40% solids slurry. Additional NaCN and slaked lime are added as required to maintain a minimum NaCN concentration of about 0.2 to about 0.5 g/l NaCN, with a pH of about 10. The temperature is ambient and usually about 4 to 8 hours retention time is required in continuous mode of operation.

Both gold and silver report in high yield to the cyanide solution, and are recovered typically by the established process of carbon-in-pulp circuit, whereby activated carbon is added to the cyanide slurry to absorb the precious metals, without the necessity of filtration. The loaded carbon, now rich in precious metals is separated by screening (445) and the barren pulp discarded to tailing.

The loaded carbon is treated by established methods to recover the precious metals content by a leach/electrowin/smelt process (447). The product is generally Dore metal containing both gold and silver, which is sent to a gold refinery 449 for final separation of gold from silver. Barren carbon from a carbon regeneration step 451 after the precious metals recovery, is recycled to the carbon-in-pulp circuit 444.

The overall recovery of precious metals by the total process is generally well over 90%, and under optimum conditions approach 99%.

A test was carried out in which desulphurized residue was processed in a total oxidative leach 414 at 220° C. for 2 hours under oxygen pressure and then depressurized and cooled to room temperature. The resultant slurry was neutralized to pH 3 with limestone and then filtered. The filtered cake was then leached with cyanide solution under standard conditions to leach gold and silver.

The gold extraction after the total oxidative leach 414 and cyanidation 444 was 97% with only 1.0 kg/t NaCN consumption. In comparison, the gold extraction on a residue that had not been oxidized in the total oxidative leach 414 was only 34% and cyanide consumption was extremely high at 19.0 kg NaCN/t.

Figure 4:
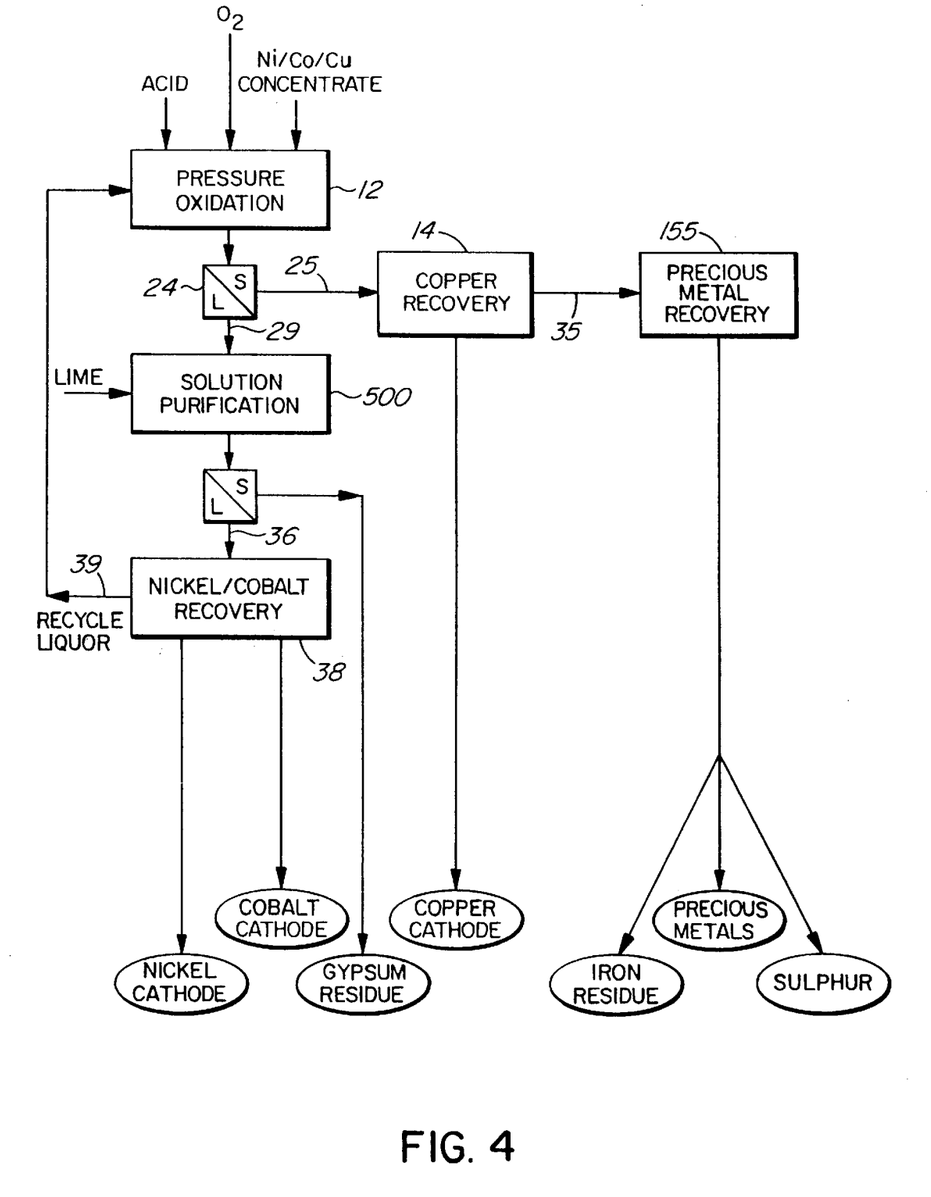
FIG. 4 is a flow diagram of another hydrometallurgical metal extraction process.

FIG. 4 is a flow diagram of Mode A. Steps which correspond with those of the embodiment of FIG. 1 are given the same reference numerals.

The process comprises a pressure oxidation stage 12 in which sulphide minerals in the concentrate or ore are oxidized by high pressure oxygen, followed by a liquid/solid separation (e.g. filtration) 24, producing a solid (pressure oxidation filter cake) 25 and pressure oxidation filtrate 29.

The solid 25 contains all or almost of the copper content of the feed concentrate, and is treated for copper recovery 14 by acid leaching, solvent extraction and electrowinning as in the embodiment of FIG. 1, thus producing high quality copper cathodes, and a residue 35 which may contain precious metals. The residue 35 can be treated for precious metal recovery, as described with reference to FIGS. 3A and B above. This is indicated by the block 155 in FIG. 4.

The filtrate 29 is purified at 500 to remove deleterious elements such as Cu, Fe and Zn, by neutralization with slaked lime to about pH 6, as described with reference to FIG. 1, producing a purified solution 36, after filtration, containing Ni, Co and certain other elements such as Mg which may be present in the feed concentrate.

The solution 36 is treated for Ni/Co recovery as described with reference to FIG. 1. This is indicated by the block 38 in FIG. 4. The solution 39 produced in 38 is recycled back to the pressure oxidation 12, to complete the cycle, as before (stream 516 in FIG. 1).

While only preferred embodiments of the invention have been described herein in detail, the invention is not limited thereby and modifications can be made within the scope of the attached claims.

What is claimed is:

1. A process for the extraction of nickel and cobalt values from a solution, comprising the steps of effecting a cobalt solvent extraction in the presence of magnesium ions with a cobalt extractant to produce a cobalt extractant loaded with cobalt ions and a first raffinate containing nickel and magnesium ions as well as a reduced amount of cobalt ions in solution;

effecting a magnesium solvent extraction on the first raffinate with a magnesium extractant to produce a magnesium extractant loaded with magnesium and cobalt ions and a second raffinate; and effecting a nickel solvent extraction on the second raffinate with a nickel extractant to produce a nickel loaded extractant and a third raffinate.

2. The process according to claim 1, further comprising the step of maintaining a magnesium to cobalt concentration ratio of from about 1:5 to about 5:1 during the cobalt solvent extraction.

3. The process according to claim 2, wherein the magnesium concentration is maintained to be about the same as the cobalt concentration.

4. A process according to claim 1, further comprising the step of stripping the cobalt and nickel loaded extractants to produce cobalt and nickel solutions, respectively.

5. A process according to claim 4, wherein, prior to the stripping, the cobalt loaded extractant is scrubbed with a cobalt concentrate solution which is recycled from the stripping.

6. A process according to claim 5, further comprising the step of subjecting the cobalt and nickel solutions to electrowinning to recover cobalt and nickel therefrom.

7. A process according to claim 1, further comprising the step of:

stripping the magnesium extractant to produce a pregnant solution containing magnesium and cobalt ions.

8. A process according to claim 7, wherein prior to stripping the magnesium extractant, it is scrubbed with a magnesium concentrate solution which comprises pregnant solution which is recycled from the stripping of the magnesium extractant.

9. A process according to claim 1, wherein the cobalt extractant is the same as the magnesium extractant, the extractant being more selective for cobalt than for magnesium.

10. The process according to claim 1, wherein the solvent extractions are carried out at a temperature of from about 30° C. to about 60° C.

11. The process according to claim 10, wherein the temperature is from about 40° C. to about 50° C.

* * * * *